Jan. 17, 1939.　　　K. L. WOODMAN　　　2,144,474
VENTILATED HANDLE FOR SADIRONS
Filed Sept. 23, 1936
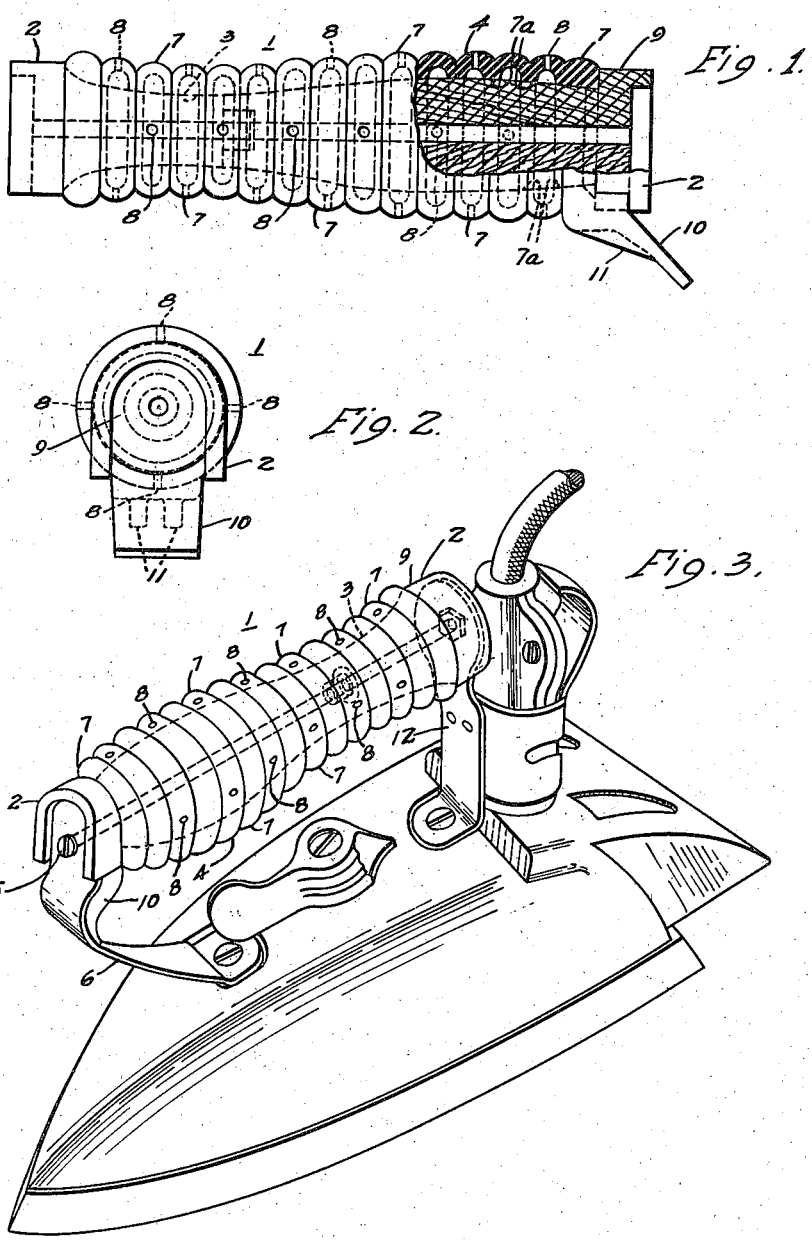
WITNESSES:
Michael Stack
H.G. Kepler
INVENTOR
Kenneth L. Woodman.
BY
W R Coley
ATTORNEY Patented Jan. 17, 1939

2,144,474

UNITED STATES PATENT OFFICE 2,144,474

VENTILATED HANDLE FOR SADIRONS

Kenneth L. Woodman, Mansfield, Ohio, assignor to Westinghouse Electric & Manufacturing Company, East Pittsburgh, Pa., a corporation of Pennsylvania Application September 23, 1936, Serial No. 102,077

10 Claims. (Cl. 38—90)

My invention relates to sadirons, and more particularly to the handle of such irons.

It is an object of my invention to provide a handle with a novel grip, the surface of which will remain particularly cool even though the iron be hot.

It is a further object of my invention to provide a corrugated cover for the portion of the handle intended to be gripped.

It is a further object of my invention to provide a cover of irregular shape for the handle with an air space separating most of the cover from the handle core.

It is a further object of my invention to provide means for changing the air in the air space between the handle cover and the handle core.

It is a further object of my invention to provide a protective device which will prevent the fingers of the operator from coming in contact with the metallic parts of the handle.

Other objects of my invention will either be pointed out specifically in the course of the following description of the proposed structure or will be apparent from such description and the accompanying drawing, in which:

Figure 1 is a partial plan and sectional view of the sadiron handle cover embodying my invention in place on a handle core, Fig. 2 is an end view of said cover and core; and Fig. 3 is a perspective view of a sadiron equipped with a handle cover embodying my invention.

In Fig. 1, a hollow corrugated tubular member 1 of irregular shape is shown which constitutes the cover for a sadiron handle core 9. This tubular member 1 is composed of a resilient non-metallic material, preferably soft rubber. The tubular member or handle cover is not of uniform internal diameter but may be of uniform thickness throughout its entire length. The external and internal diameters of the handle cover are smallest at a position intermediate the rear end and the center portion of the handle, substantially as shown at 3 in Fig. 1. They are largest at a position intermediate the center portion of the handle cover and the forward end thereof, substantially as shown at 4 in Fig. 1. The general shape illustrated is adapted to readily and comfortably fit the user's hand.

A plurality of small substantially parallel corrugations or ribs 7 extend radially about the handle cover and continue for the full length thereof. These corrugations or ribs 7 result in the handle cover 1 having a small contact area (spaced annular surfaces 7a only) with the handle core 9. This contact area being a small percentage of the whole handle area reduces the heat conducted from the handle core to the cover thereof and is a substantial factor in keeping the cover relatively cool.

The handle cover 1 is supplied with a plurality of perforations 8 which are preferably located at the crests of the corrugations or ribs 7. Two or more of these perforations are located upon each crest and extend entirely through the wall of the cover affording communication between the interior and the exterior thereof. The perforations may be placed within alternate corrugations or ribs 7, substantially as shown, although my invention is not limited thereto.

A tab 10 is shown as being attached to the front of the handle cover 1. This tab is a preferably integral part of the handle cover 1 and is of the same resilient material. A plurality of ridges 11 are located on and are integral with the underside of the tab 10. These ridges 11 strengthen the tab and force it to conform to and fit tightly against a curved or irregular shaped handle strap or handle-supporting member 6 when the cover 1 is placed about the handle of a sadiron. A tab similar to tab 10 may be placed at the other end of handle cover 1 if so desired.

The ridges 11 being upon the open side of tab 10 result in there being a larger surface area upon the outside than upon that which is in contact with the handle uprights. Due to this larger radiating surface upon the outside of the tab in reference to the conducting or contact surface upon the inner side of the tab, the temperature upon the outer surface, while the iron is being used, will be much lower than that of the handle uprights.

The handle core 9 or that portion of the handle on which the corrugated tubular cover 1 is placed is preferably made of wood and may be in two pieces to facilitate the placing of the cover thereon. A screw head 5 illustrates the head of a screw bolt which fastens the handle core to a forward upright 6. This core extends through the handle cover 1 (as illustrated by the dotted lines in Fig. 3), fitting the internal surfaces 7a, and is attached to a rear upright 7 in a similar manner.

Between the ends of cover 1 and the uprights 6 and 7 are non-metallic flanges or caps 2. These caps serve to secure the cover 1 from endwise movement that would separate it from the handle core or uprights. The flanges or caps 2 may be separate from the handle core, though it is preferred that the flanges be an integral part thereof.

The handle cover 1, being of resilient material, may, however, move longitudinally in relation to the handle core by the compression of one part or another as the iron is moved about. In addition, in yielding to the pressure of the user's hand, it may reduce the annular volume within the cover or within some particular part thereof. This reduction in volume within the handle cover causes the air to flow out through the perforations therein. Then when the pressure upon the cover is released it expands and thereby sucks the air back in through the perforations. This circulation or breathing of the air within the handle cover tends to cool it as well as the handle core therein.

In the operation of the iron the operator grasps the handle, her hand compressing the resilient material of the cover, thereby squeezing some air out of the interior. As she uses the iron, the pressure exerted by her hand is shifted more or less along the cover. Especially in manipulating the iron for ironing shirt collars or the like, a considerable component of the pressure exerted will be forward, thus compressing and expanding the part of the cover having the larger diameter. The handle will, therefore, first expel the enclosed warm air and then draw back in cooler air. This breathing of the air within the handle cover keeps the temperature thereof considerably below that of the handle core.

When the hand of the operator is removed, the cover returns entirely to its normal configuration, which action is accompanied by a restoration of the interior space to its full original volume. More air, therefore, enters through the perforations and when the hand is replaced the cover is again compressed, the air again being expelled through the same perforations. This additional circulation of the air within the cover tends to keep the temperature thereof at a still lower value.

While the operator is using the iron, and particularly when she is attempting to execute some intricate piece of work with the iron, or when placing the iron on its heel rest, her forward finger is very likely to move beyond the forward end of the tubular part of the handle cover. When this happens, her finger comes in contact with the tab 10, which prevents her finger from reaching the hot handle upright 6 and, therefore, the presence of the tab 10 prevents the finger from becoming injured.

It is, therefore, obvious that I have provided a handle cover that, due to the breathing thereof and the small contact area between the cover and the handle core, will remain cool while the iron is at a high working temperature. In addition, I have provided means comprising the tabs placed at one or both ends of the handle cover for preventing the fingers of the operator from coming in contact with the metallic handle uprights.

Various modifications may be made in the device embodying my invention without departing from the spirit and scope thereof, and I desire, therefore, that only such limitations shall be placed thereon as are imposed by the prior art and the appended claims.

I claim as my invention:

1. In a sadiron handle, a core and a cover of resilient thermally insulating material fitting the handle core with sufficient looseness to permit motion between said cover and the handle core when pressure of the user's hand is exerted on the cover in using the sadiron, said cover having distinct transverse perforations, whereby flow of air outwardly through said perforations can be caused by said motion.

2. In a sadiron handle, a core and a corrugated cover of resilient thermally insulating material fitting the handle core with sufficient looseness to permit motion between said cover and the handle core when pressure of the user's hand is exerted on the cover in using the sadiron, said cover being perforated at spaced points to provide straight communicating passages from said handle core to the outside surface of said cover, whereby flow of air through said perforations can be caused by said motion.

3. In a sadiron handle, a core and a corrugated cover of resilient thermally insulating material fitting the handle core with sufficient looseness to permit motion between said cover and the handle core when pressure of the user's hand is exerted on the cover in using the sadiron, said cover being perforated, whereby flow of air through said perforations can be caused by said motion, the perforations extending to the crests of the corrugations.

4. In a sadiron handle, two metallic uprights and a grip portion between them, a corrugated cover of resilient thermally insulating material fitting said portion so loosely that relative motion between said cover and portion can be produced by the user's hand, said cover having perforations extending from the crests of certain corrugations to the interior of said cover, a tab of the same material on said cover extending along the inner face of one of said uprights and so protecting the user's fingers from the heat of said upright, the cover being of non-uniform diameter, whereby the pressure of the user's hand on it will vary during the use of the iron thereby causing said relative motion with consequent change of air within the cover accompanied by flow through the perforations.

5. In a sadiron handle, a core and a resilient cover fitting loosely on the core portion of said handle, said cover having transverse perforations and being corrugated, the inner extremities of said perforations having free access to an air supply, and said cover being longitudinally and transversely resilient whereby the shape of the cover will change during use with consequent change of volume and flow of air through the perforations.

6. In a sadiron handle, two metallic uprights and a tubular corrugated resilient thermally insulating gripping device of non-uniform diameter between them, said gripping device having a plurality of perforations extending from the crests of the corrugations to the interior thereof, means comprising a tab of the same material extending radially from an end of said device along the inner face of one of said uprights for protecting the user's fingers from the heat therefrom, said gripping device being resilient whereby the shape of the device will change during use with consequent change of volume and flow of air through the perforations.

7. A corrugated resilient thermally insulating handle cover of non-uniform diameter having a plurality of perforations extending from the crests of the corrugations to the interior thereof, and a tab of the same material extending radially from an end of said cover.

8. A corrugated resilient thermally insulating handle cover of non-uniform diameter having a plurality of perforations extending from the crests of the corrugations to the interior thereof, a tab of the same material extending radially from an end of said cover, and a plurality of ridges on the inner or lower side of said tabs.

9. In a sadiron handle, a core and a corrugated cover of resilient thermally insulating material fitting the handle core with spaced internal surfaces to permit motion between said cover and the handle core when pressure of the user's hand is exerted on the cover in using the sadiron, said cover being perforated, whereby flow of air through said perforations can be caused by said motion, the perforations extending to the crests of the corrugations.

10. In a sadiron handle, two metallic uprights and a grip portion between them, a corrugated cover of resilient thermally insulating material fitting said portion with spaced internal surfaces so that relative motion between said cover and portion can be produced by the user's hand, said cover having perforations extending from the crests of certain corrugations to the interior of said cover, a tab of the same material on said cover extending along the inner face of one of said uprights and so protecting the user's fingers from the heat of said upright, the cover being of non-uniform diameter, whereby the pressure of the user's hand on it will vary during the use of the iron thereby causing said relative motion with consequent change of air within the cover accompanied by flow through the perforations.

KENNETH L. WOODMAN.